United States Patent
Suryanarayana et al.

(10) Patent No.: US 11,627,468 B2
(45) Date of Patent: Apr. 11, 2023

(54) CONNECTING SECURELY TO A WIRELESS DISPLAY FROM BIOS

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 591 days.

(21) Appl. No.: 16/780,321

(22) Filed: Feb. 3, 2020

(65) Prior Publication Data
US 2021/0243594 A1    Aug. 5, 2021

(51) Int. Cl.
| | |
|---|---|
| *H04W 12/50* | (2021.01) |
| *G06F 9/4401* | (2018.01) |
| *H04N 21/258* | (2011.01) |
| *G06F 21/84* | (2013.01) |
| *H04N 21/2347* | (2011.01) |
| *H04W 12/04* | (2021.01) |
| *H04W 12/041* | (2021.01) |
| *H04W 12/069* | (2021.01) |

(52) U.S. Cl.
CPC .......... *H04W 12/50* (2021.01); *G06F 9/4401* (2013.01); *G06F 21/84* (2013.01); *H04N 21/2347* (2013.01); *H04N 21/25816* (2013.01); *H04W 12/04* (2013.01); *H04W 12/041* (2021.01); *H04W 12/069* (2021.01)

(58) Field of Classification Search
CPC . H04W 12/50; H04W 12/069; H04W 12/041; H04W 12/04; G06F 9/4401; G06F 21/84; H04N 21/2347; H04N 21/25816
See application file for complete search history.

(56) References Cited

U.S. PATENT DOCUMENTS

| | | | |
|---|---|---|---|
| 2005/0055486 A1* | 3/2005 | Natu | G06F 3/1454 710/260 |
| 2006/0079333 A1* | 4/2006 | Morrow | G07F 17/3206 463/43 |
| 2009/0136041 A1* | 5/2009 | Tsu | G06F 21/84 380/278 |
| 2011/0110651 A1* | 5/2011 | Li | H04N 21/43072 386/356 |

(Continued)

*Primary Examiner* — Jeremy S Duffield
(74) *Attorney, Agent, or Firm* — Kirton McConkie; Brian Tucker

(57) ABSTRACT

During the boot process, a secure wireless display connect module of the BIOS can authenticate a wireless display and determine whether the wireless display can comply with the HDCP. When the secure wireless display connect module determines that the wireless display is HDCP compliant, the secure wireless display connect module can create an ACPI secure blob in which is stored a shared session key generated as part of determining that the wireless display is HDCP compliant. A video authentication session module of the BIOS can then retrieve this shared session key from the ACPI secure blob and use it to encrypt video frames that are to be sent to the wireless display. The video authentication session module may additionally embed a session ID and a timeout into each video frame which the wireless display can employ to detect when the video frame should no longer be displayed.

20 Claims, 6 Drawing Sheets

(56) References Cited

U.S. PATENT DOCUMENTS

| | | | |
|---|---|---|---|
| 2012/0017072 A1* | 1/2012 | Gillespie | G06F 3/14 |
| | | | 348/E7.003 |
| 2014/0129827 A1* | 5/2014 | Khosravi | H04L 9/0825 |
| | | | 713/155 |
| 2016/0366015 A1* | 12/2016 | Prendergast | G05B 19/02 |
| 2018/0075242 A1* | 3/2018 | Khatri | H04L 9/3263 |
| 2018/0268146 A1* | 9/2018 | Suryanarayana | G06F 21/445 |
| 2018/0330080 A1* | 11/2018 | Dong | G06F 21/53 |
| 2020/0015296 A1* | 1/2020 | Lo | H04W 76/14 |
| 2020/0195439 A1* | 6/2020 | Suresh | H04L 67/08 |
| 2021/0067961 A1* | 3/2021 | Dhammawat | H04W 12/041 |
| 2021/0097640 A1* | 4/2021 | Akiyama | G09G 5/363 |

\* cited by examiner

CONNECTING SECURELY TO A WIRELESS DISPLAY FROM BIOS

CROSS-REFERENCE TO RELATED APPLICATIONS

N/A

BACKGROUND

BIOS firmware (BIOS) is the first software that is executed on the CPU when a computing system is powered on. The primary task of the BIOS is to initialize the hardware and load the operating system (OS). For purposes of this specification and the claims, the term BIOS should be construed as encompassing conventional BIOS, Unified Extensible Firmware Interface (UEFI) BIOS and any other similar firmware that is used to boot a computing system.

In a UEFI-based system, the BIOS is loaded to perform the boot process in a number of phases. The security (SEC) phase is the initial phase which prepares the computing system for the Pre-EFI initialization (PEI) phase. During the PEI phase, PEIM modules (or drivers) are loaded to initialize the low level hardware such as the system memory. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) is accessed to identify and load the boot loader. The boot loader will then load the OS kernel and transfer control the OS as part of transitioning to the runtime (RT) phase.

Technology exists for connecting a computing system to a wireless display (or monitor). For example, Miracast is a solution that allows a computing system to connect to a wireless display via Wi-Fi direct. The wireless display may either directly incorporate Miracast functionality or may include a dongle (e.g., a ScreenBeam dongle) that implements the Miracast functionality. Yet, the use of Miracast (or a similar technique) to send video content to a wireless display may not be secure. For example, in order to implement High-Bandwidth Digital Content Protection (HDCP), it is necessary to employ separate hardware (e.g., a Miracast dongle) and a corresponding driver on the computing system. However, if the computing system's BIOS does not support such hardware, HDCP cannot be implemented. In such cases, the video content will be sent to the wireless display without HDCP.

Additionally, there currently is no solution for securely connecting to a wireless display during the pre-boot process. As a result, it is not possible to securely display a BIOS boot screen on a wireless display. Furthermore, even when a computing system may provide HDCP support with a wireless display, various vulnerabilities may still exist. For example, when the computing system is resumed, the playback of video content to the wireless display may be resumed without HDCP which could enable the video content to be displayed on a non-HDCP-compliant wireless display. It is also possible to bypass HDCP by connecting a non-HDCP-compliant wired display to the computing system while it is streaming HDCP video content to a wireless display.

Given that wireless displays are oftentimes in public areas, there are also vulnerabilities due to the wireless display being accessible to unauthorized users. For example, a malicious user could access a mouse or keyboard that is connected to a wireless display to trigger an improper command on the computing system (e.g., changing a BIOS setting). Also, if an authorized user boots the computing system into a BIOS or other setup screen that is displayed on a wireless display and forgets to log out, an unauthorized user could use the wireless display to make unauthorized changes via the BIOS or other setup screen.

BRIEF SUMMARY

The present invention extends to methods, systems, and computer program products for connecting securely to a wireless display from BIOS. During the boot process, a secure wireless display connect module of the BIOS can authenticate a wireless display and determine whether the wireless display can comply with the HDCP. As part of this determination, the secure wireless display connect module can employ a BIOS-based certificate store to verify a certificate of the wireless display. When the secure wireless display connect module determines that the wireless display is HDCP compliant, the secure wireless display connect module can create an ACPI secure blob in which is stored a shared session key generated as part of determining that the wireless display is HDCP compliant.

A video authentication session module of the BIOS can then retrieve this shared session key from the ACPI secure blob and use it to encrypt video frames that are to be sent to the wireless display. The video authentication session module may additionally embed a session ID and a timeout into each video frame which the wireless display can employ to detect when the video frame should no longer be displayed. Prior to loading the operating system, the BIOS may generate an ACPI secure node that includes the ACPI secure blob and the video authentication session module to thereby allow the operating system to employ the ACPI secure node to send HDCP-compliant video content to the wireless display.

In some embodiments, the present invention is implemented by BIOS during a boot process on a computing system as a method for connecting securely to a wireless display. The BIOS can authenticate with a wireless display and detect that the wireless display is compliant with HDCP. The BIOS can then generate encrypted video frames that comply with the HDCP and send the encrypted video frames to the wireless display.

In some embodiments, the present invention is implemented as computer storage media storing BIOS which when executed during a boot process on a computing system perform a method for connecting securely to a wireless display during the boot process. The BIOS can perform HDCP authentication with the wireless display. The HDCP authentication may include receiving a certificate from the wireless display and verifying the certificate against a BIOS-based certificate store. Based on the HDCP authentication, the BIOS can generate encrypted video frames that comply with the HDCP and send the encrypted video frames to the wireless display.

In some embodiments, the present invention is implemented as a computing system that includes one or more processors and computer storage media storing BIOS which when executed by the one or more processors during a boot process on the computing system perform a method for connecting securely to a wireless display during the boot process. The BIOS can perform HDCP authentication with the wireless display including generating a shared session key. The BIOS can employ the shared session key to encrypt video frames and then send the encrypted video frames to the wireless display.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "computing system" should be construed as encompassing desktops, laptops, tablets, smart phones, other mobile devices or any other type of end user computing device that includes BIOS and an operating system. The term "BIOS" should be construed as firmware that is executed on a computing system to initialize the computing system and load the operating system. The term "wireless display" should be construed as a display device that is capable of receiving video content wirelessly from a computing system in accordance with HDCP or an equivalent solution that may supplement or supersede HDCP. A wireless display should be construed as encompassing display devices that include added hardware (e.g., a dongle) that implements the HDCP functionality.

Figure 1:
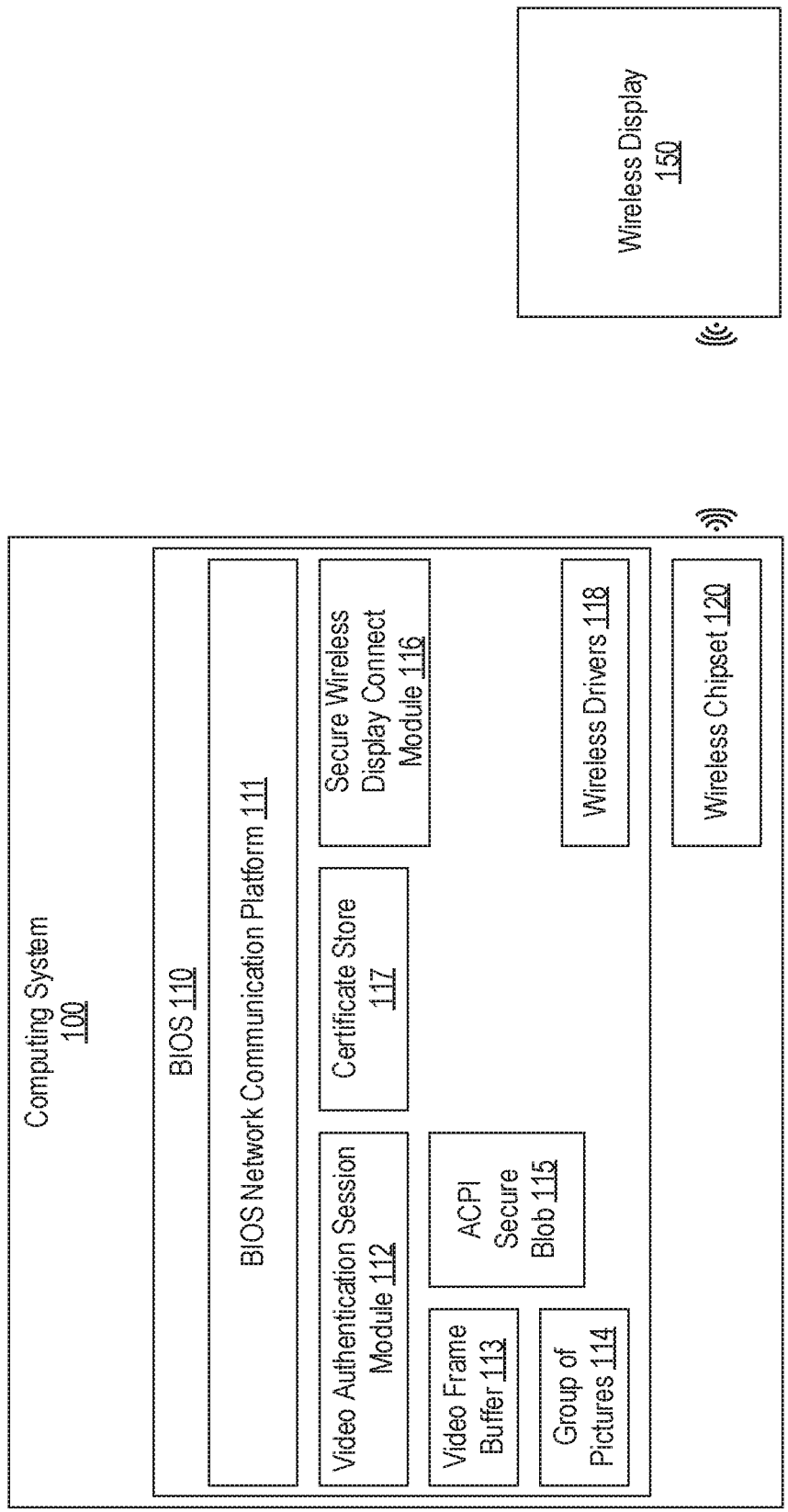
FIG. 1 illustrates an example architecture of a computing system that is configured in accordance with embodiments of the present invention.

FIG. 1 illustrates an example architecture of a computing system 100 that is configured in accordance with embodiments of the present invention to enable computing system 100 to connect to and communicate securely with a wireless display 150. The architecture depicted in FIG. 1 is intended to represent the state of computing system during the boot process. For example, FIG. 1 may represent the state of computing system 100 during the early stages of the DXE phase in UEFI-based implementations. It is noted that the depicted components would typically represent a small subset of the firmware and hardware that would exist on a computing system.

As shown, BIOS 110 has been loaded and is executing on computing system 100 to initialize computing system 100 prior to loading the operating system. BIOS 110 incudes a BIOS network communication platform 111 which enables computing system 100 to communicate using application layer network protocols prior to the loading of the operating system. As an example specific to Dell computing systems, BIOS network communication platform 111 can represent Dell's BIOSConnect platform. BIOS 110 also includes a video authentication session module 112, a video frame buffer 113 a group of pictures 114 and an Advanced Configuration and Power Interface (ACPI) secure blob 115 which, in general terms, are employed to transfer video content to wireless display 150 in accordance with HDCP. BIOS 110 also includes a secure wireless display connect module 116 and a certificate store 117 which, in general terms, are employed to securely discover and connect to authorized wireless displays. Wireless drivers 118 and wireless chipset 120 can represent the firmware and hardware respectively for sending and receiving wireless communications.

Figure 2A:
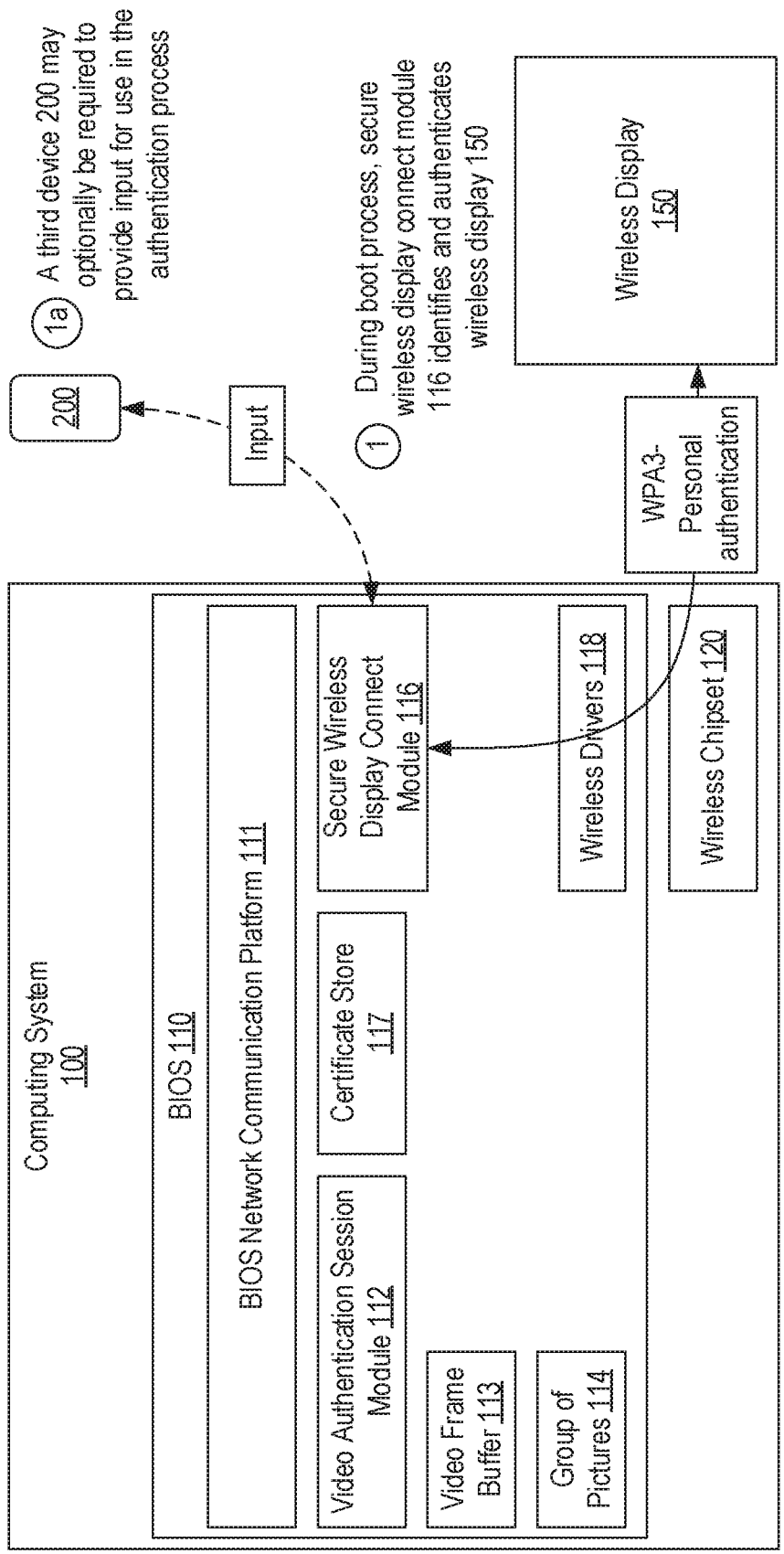
FIGS. 2A-2D provide an example of how BIOS can connect securely to a wireless display, transmit HDCP-compliant video content during the boot process and then enable HDCP-compliant video content to be sent at runtime.
Figure 2B:
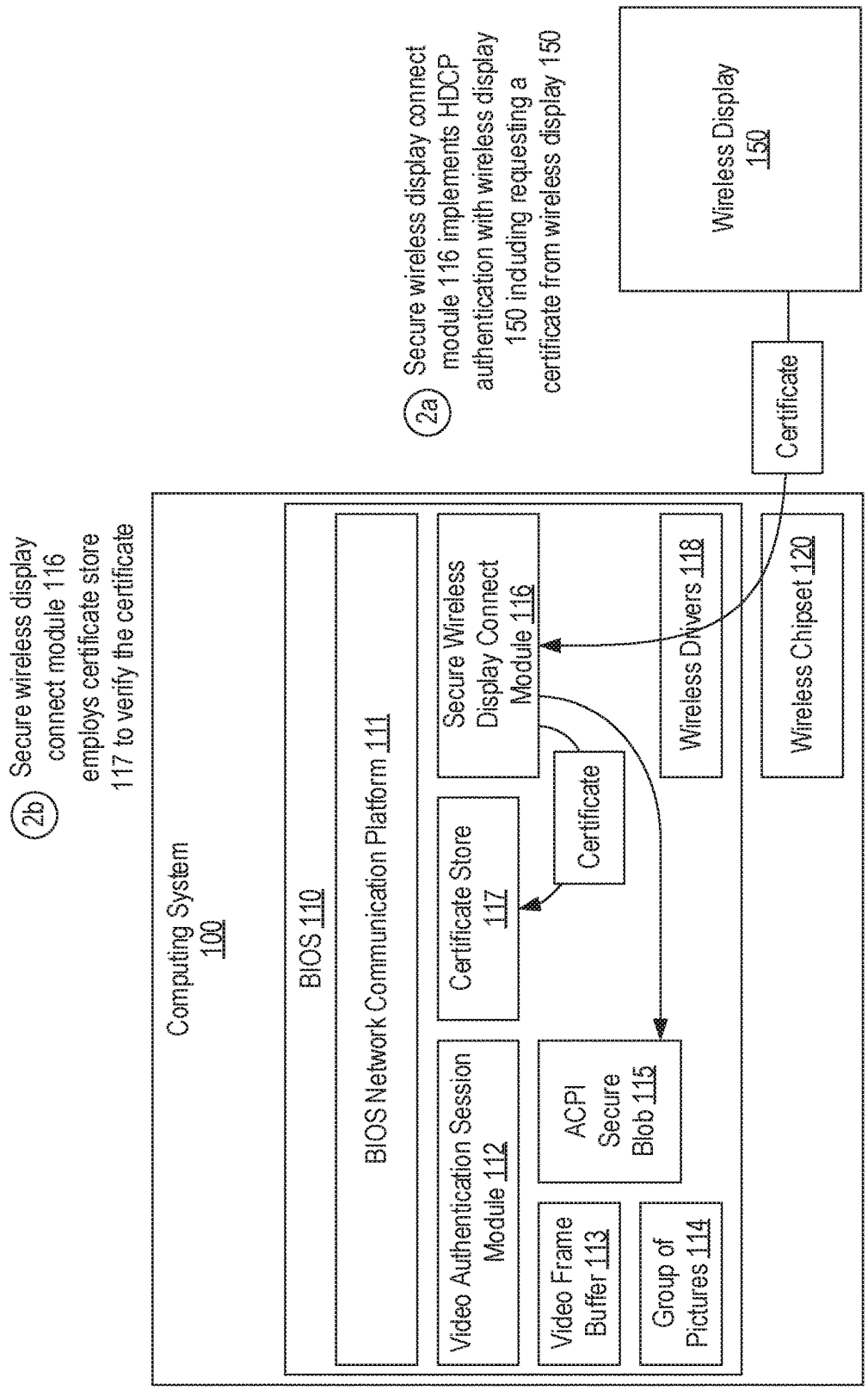
Figure 2C:
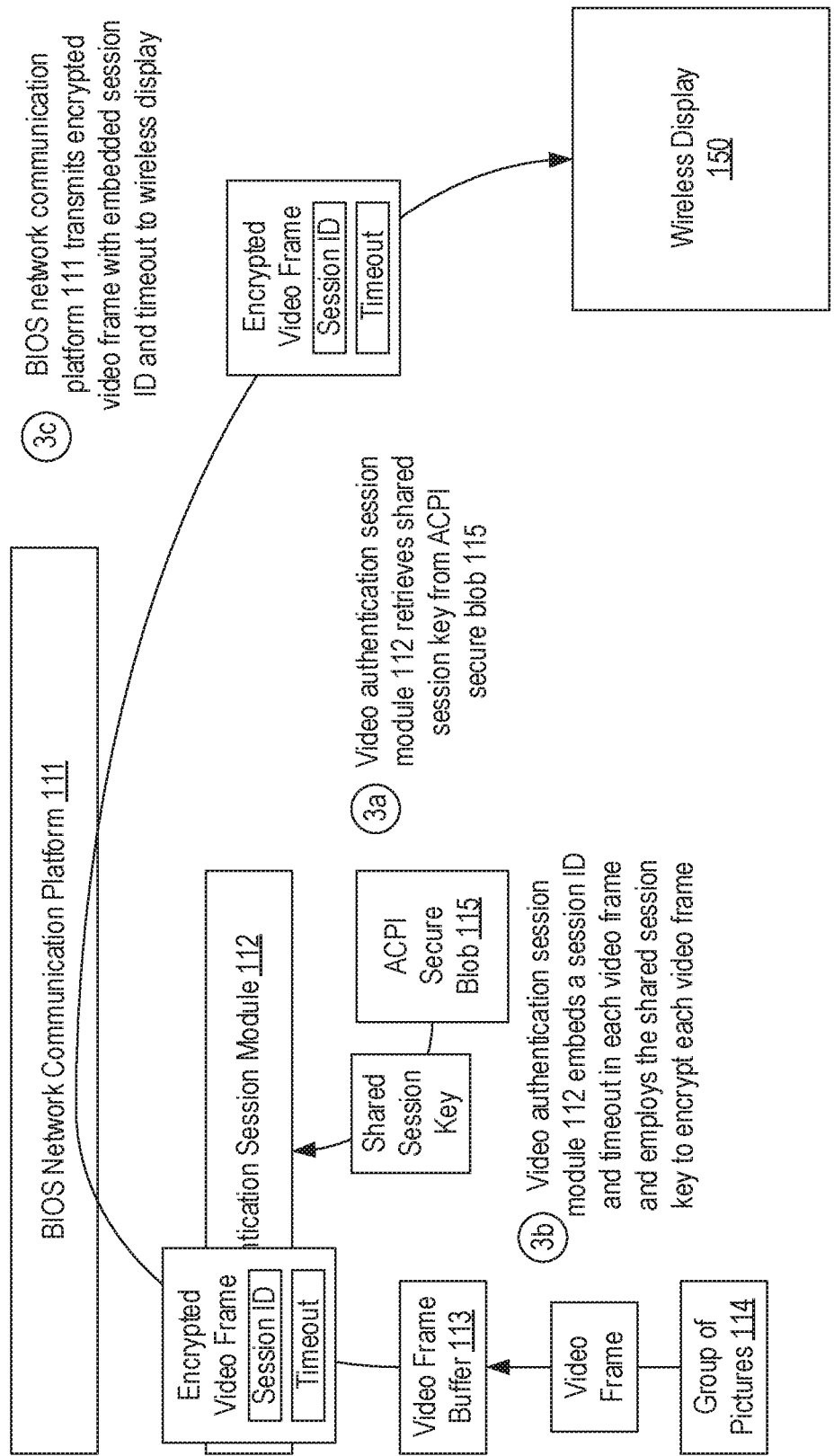

FIGS. 2A-2C provide an example of how BIOS 110 can be utilized to securely connect to wireless display 150 during the boot process (e.g., during the early stages of the DXE phase). In step 1 shown in FIG. 2A, secure wireless display connect module 116 is executed during the boot process and can detect the presence of wireless display 150 and implement authentication techniques (e.g., WPA3-Personal) to authenticate wireless display 150. In some embodiments, secure wireless display connect module 116 may require a third device 200 (e.g., a smart phone) to provide input to be employed during the authentication process in optional step 1a. For example, the user that has caused computing system 100 to boot may be required to employ his or her smart phone to input a password or provide a secret code that secure wireless display connect module 116 will employ to authenticate with wireless display 150. In this way, a three way trust can be established.

Turning to FIG. 2B, once secure wireless display connect module 116 has successfully authenticated with wireless display 150 to thereby create a secure wireless connection, in step 2a, secure wireless display connect module 116 can implement HDCP authentication with wireless display 150 including, among other functions, requesting a certificate from wireless display 150. Then, in step 2b, secure wireless display connect module 116 can employ certificate store 117 to verify the certificate received from wireless display 150. By implementing steps 2a and 2b, secure wireless display connect module 116 can determine whether wireless display 150 is compliant with HDCP. Notably, certificate store 117 is part of BIOS 110 which enables secure wireless display connect module 116 to confirm wireless display 150's HDCP compliance during the boot process. Also, in step 2c, secure wireless display connect module 116 can employ the results on the authentication process to create ACPI secure blob 115. For example, ACPI secure blob 115 can represent a data structure accessible via the ACPI in which is stored, among possibly other things, the DHCP shared session key that was generated by secure wireless display connect module 116 as part of performing DHCP authentication with wireless display 150.

At this point, secure wireless display connect module 116 will have established a secure Wi-Fi connection with wireless display 150 and verified that wireless display 150 is HDCP compliant during the boot process and without requiring external hardware (e.g., a Miracast dongle). In other words, secure wireless display connect module 116 and wireless display 150 will have established a "trusted session" for the transfer of video content. Yet, it will still be necessary to transfer HDCP-compliant video content over this trusted session with wireless display 150. Video authentication session module 112 performs this role by implementing a technique for sending HDCP-compliant video content from BIOS 110 during the boot process.

Turning to FIG. 2C, in which various components have not been remove from the depiction, group of pictures 114 can define a sequence of video frames that are to be displayed during the boot process (e.g., a frame containing the Dell logo on a Dell computing system). Video frame buffer 113 can represent any buffer where the video frames in group of pictures 114 are temporarily stored prior to being transmitted to wireless display 150. To cause the video frames in group of pictures 114 to be transmitted in compliance with HDCP, in step 3a, video authentication session module 112 can access ACPI secure blob 115 to obtain the shared session key. In step 3b, video authentication session module 112 embeds a session ID and defines a timeout within each video frame and uses the shared session key to encrypt each video frame. Video authentication session module 112 can be configured to perform this encryption in accordance with HDCP. Then, in step 3c, BIOS network communication platform 111 can retrieve the encrypted video frames from video frame buffer 113 and transmit them to wireless display 150 (e.g., using Miracast techniques).

This session ID can identify the trusted session that secure wireless display connect module 116 established with wireless display 150 and can inform wireless display 150 that a received video frame pertains to the trusted session. The timeout defines a time after which wireless display 150 will no longer display the video frame. For example, if computing system 100 sends a frame containing a BIOS setup screen, wireless display 150 would display it as long as it was properly encrypted. However, if the user of computing system 100 forgot to log out of the BIOS setup screen, wireless display 150 would eventually detect that the timeout for the currently displayed video frame has been reached and in response would cease to display the video frame. In other words, the embedded timeout is a mechanism to prevent wireless display 150 from displaying a video frame indefinitely.

Video authentication session module 112 can perform this process of encrypting video frames with embedded session IDs and timeouts for each video frame that is to be sent during the boot process. For example, other components of BIOS 110 may be configured to select video frames from group of pictures 114 and deliver them to video frame buffer 113. Video authentication session module 112 can detect such video frames in video frame buffer 113 and process them accordingly. In this way, each video frame that is generated for output during the boot process can be encrypted to enable it to be transferred to wireless display 150 in accordance with the HDCP.

Figure 2D:
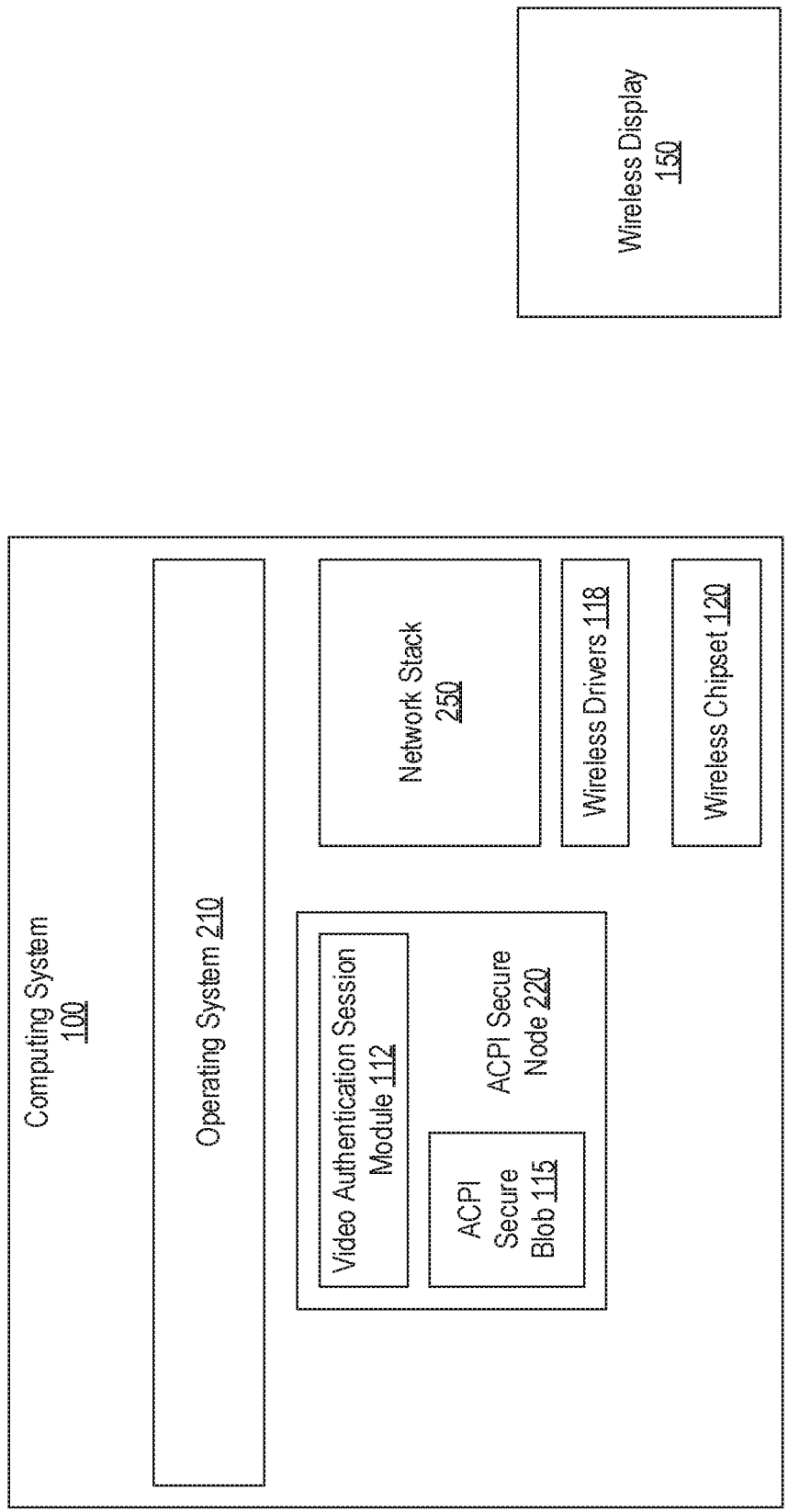

FIG. 2D represents an example architecture of computing system 100 after operating system 210 and network stack 250 have been loaded. In particular, as the boot process proceeds towards loading of the operating system, BIOS 110 can create ACPI secure node 220 (e.g., an ACPI object) which provides operating system 210 with access to video authentication session module 112 and ACPI secure blob 115 at runtime. Through ACPI secure node 220, operating system 210 (or a user-mode application) can cause the above-described process to be performed to transmit HDCP-compliant video content at runtime without requiring any additional hardware. For example, operating system 210 could provide video frames to a video frame buffer accessible to video authentication session module 112 which can in turn generate encrypted video frames using ACPI secure blob 115 that are then transmitted via network stack 250.

Figure 3:
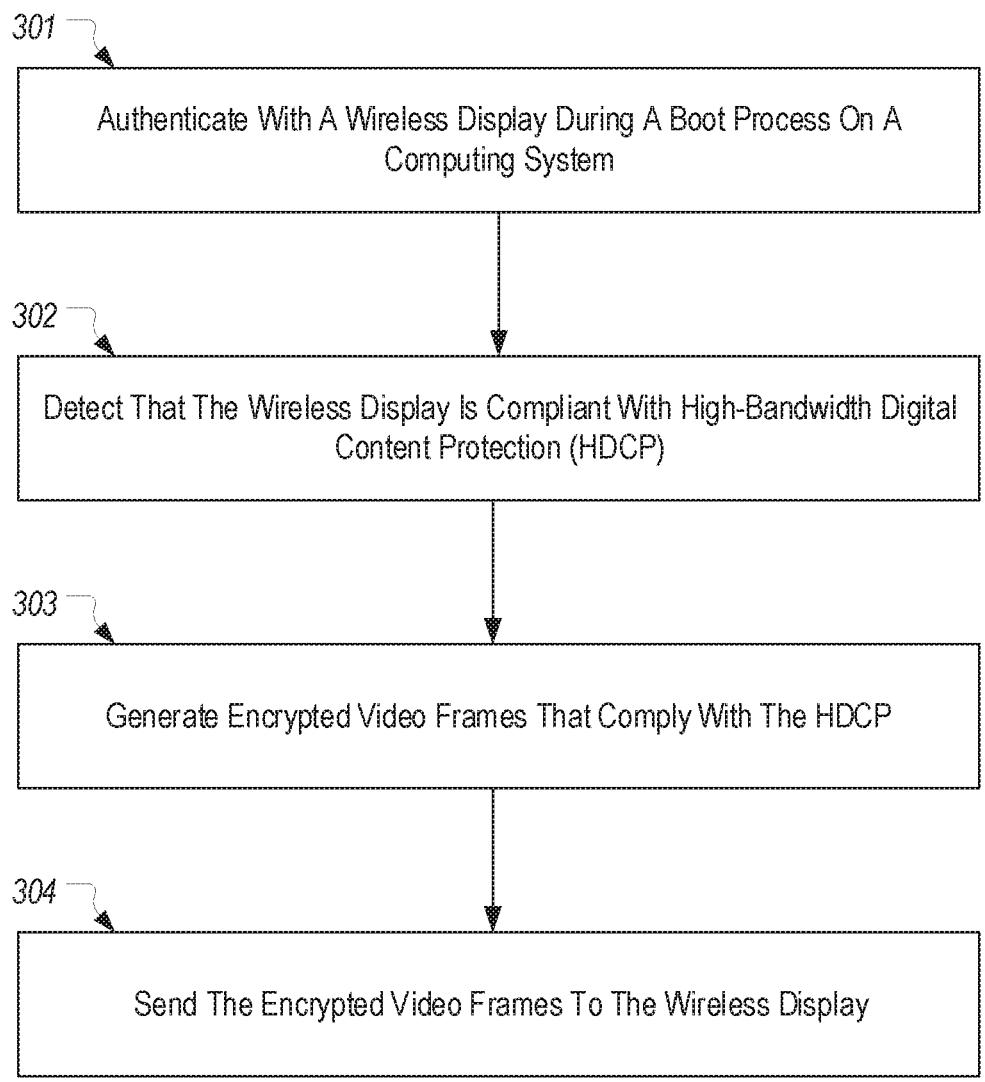
FIG. 3 provides a flowchart of an example method for connecting securely to a wireless display from BIOS.

FIG. 3 provides a flowchart of an example method 300 for connecting securely to a wireless display during a boot process on a computing system. Method 300 can be implemented by BIOS 110 on computing system 100.

Method 300 includes an act 301 of authenticating with a wireless display. For example, secure wireless display connect module 116 can authenticate with wireless display 150 using WPA3-Personal, HDCP or another authentication technique.

Method 300 includes an act 302 of detecting that the wireless display is compliant with HDCP. For example, secure wireless display connect module 116 may perform the authentication and key exchange (AKE), locality check, and session key exchange (SKE) phases of the HDCP 2.2 authentication protocol including employing certificate store 117 to verify a certificate received from wireless display 150.

Method 300 includes an act 303 of generating encrypted video frames that comply with the HDCP. For example, video authentication session module 112 may employ a shared session key that secure wireless display connect module 116 stored in ACPI secure blob 115 to encrypt video frames.

Method 300 includes an act 304 of sending the encrypted video frames to the wireless display. For example, BIOS network communication platform 111 may implement Miracast or a similar technique to send the encrypted video frames to wireless display 150 via wireless chipset 120.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by BIOS during a boot process on a computing system, for connecting securely to a wireless display, the method comprising:
    performing, by the BIOS, the boot process prior to loading an operating system on the computing system;
    during the boot process, detecting the wireless display;
    during the boot process, authenticating with the wireless display;
    while performing the boot process, detecting that the wireless display is compliant with High-Bandwidth Digital Content Protection (HDCP) by receiving a certificate from the wireless display and verifying the certificate against a BIOS-based certificate store;
    generating encrypted video frames that comply with the HDCP using a shared session key that is generated as part of authenticating with the wireless display during the boot process; and
    wirelessly sending the encrypted video frames to the wireless display during the boot process.

2. The method of claim 1, wherein authenticating with the wireless display comprises performing WPA3-Personal-based authentication.

3. The method of claim 1, further comprising:
    storing the shared session key in a data structure.

4. The method of claim 3, wherein the data structure is an Advanced Configuration and Power Interface (ACPI) secure blob.

5. The method of claim 4, further comprising:
    generating an ACPI node that includes the ACPI secure blob and enables the operating system to cause the ACPI secure blob to be employed to encrypt the encrypted video frames that are sent to the wireless display.

6. The method of claim 1, further comprising:
    embedding a timeout in the encrypted video frames, each timeout defining when the wireless display should prevent the corresponding video frame from being displayed.

7. The method of claim 1, further comprising:
    embedding a session identifier in the encrypted video frames.

8. One or more computer storage media storing BIOS which when executed during a boot process on a computing system perform a method for connecting securely to a wireless display during the boot process, the method comprising:
    performing, by the BIOS, the boot process prior to loading an operating system on the computing system;
    during the boot process, detecting the wireless display;
    during the boot process, authenticating with the wireless display;
    while performing the boot process, detecting that the wireless display is compliant with High-Bandwidth Digital Content Protection (HDCP) by receiving a certificate from the wireless display and verifying the certificate against a BIOS-based certificate store;
    generating encrypted video frames that comply with the HDCP using a shared session key that is generated as part of authenticating with the wireless display during the boot process; and
    wirelessly sending the encrypted video frames to the wireless display during the boot process.

9. The computer storage media of claim 8, wherein the method further comprises:
    storing the shared session key in an Advanced Configuration and Power Interface (ACPI) data structure.

10. The computer storage media of claim 8, wherein the method further comprises:
    including a timeout in the encrypted video frames.

11. The computer storage media of claim 8, wherein authenticating with the wireless display comprises performing WPA3-Personal-based authentication with the wireless display.

12. A computing system comprising:
    one or more processors; and
    computer storage media storing BIOS which when executed by the one or more processors during a boot process on the computing system perform a method for connecting securely to a wireless display during the boot process, the method comprising:
        performing, by the BIOS, the boot process prior to loading an operating system on the computing system;
        during the boot process, detecting the wireless display;
        during the boot process, authenticating with the wireless display;
        while performing the boot process, detecting that the wireless display is compliant with High-Bandwidth Digital Content Protection (HDCP) by receiving a certificate from the wireless display and verifying the certificate against a BIOS-based certificate store;
        generating encrypted video frames that comply with the HDCP using a shared session key that is generated as part of authenticating with the wireless display during the boot process; and
        wirelessly sending the encrypted video frames to the wireless display during the boot process.

13. The computing system of claim 12, wherein the method further comprises:
    including a timeout in the encrypted video frames.

14. The computing system of claim 12, wherein the shared session key is stored in an Advanced Configuration and Power Interface (ACPI) data structure.

15. The method of claim 1, further comprising:
    storing the shared session key in an Advanced Configuration and Power Interface (ACPI) secure blob;
    generating an ACPI node that includes the ACPI secure blob; and
    loading the operating system;
    wherein the operating system is enabled to access the shared session key in the ACPI secure blob stored in the ACPI node to continue generating and sending encrypted video frames to the wireless display after the boot process.

16. The method of claim 1, wherein the BIOS generates and sends the encrypted video frames during a Driver Execution Environment (DXE) phase of the boot process.

17. The method of claim 1, wherein the BIOS includes a BIOS network communication platform, a video authentication session module, a video frame buffer, a group of pictures, and an ACPI secure blob by which the encrypted video frames that comply with the HDCP are generated and sent to the wireless display.

18. The method of claim 1, wherein authenticating with the wireless display comprises receiving input from a third device and using the input as part of authenticating with the wireless display.

19. The method of claim 18, wherein the third device is a mobile phone and the input is a password.

20. The method of claim 1, wherein authenticating with the wireless display comprises establishing a secure Wi-Fi connection between the BIOS and the wireless display, and wherein detecting that the wireless display is compliant with the HDCP is performed via the secure Wi-Fi connection.

* * * * *